United States Patent [19]
van der Lely et al.

[11] 3,735,856
[45] May 29, 1973

[54] CROP DRIERS AND METHOD OF DRYING CROP

[76] Inventors: Ary van der Lely, 10, Weverskade, Maasland; Cornells Johannes Gerardus Bom, 36, Esdoornlaan, Rozenburg, both of Netherlands

[22] Filed: Jan. 11, 1971

[21] Appl. No.: 105,213

[30] Foreign Application Priority Data

Jan. 12, 1970 Netherlands .......................7000329

[52] U.S. Cl....................198/58, 34/162, 198/177 R
[51] Int. Cl..............................................B65g 17/20
[58] Field of Search ......................198/177 R, 13, 58; 34/162

[56] References Cited

UNITED STATES PATENTS

| | | | |
|---|---|---|---|
| 1,986,420 | 1/1935 | Webb et al | 198/177 R |
| 2,842,251 | 7/1958 | Beckner | 198/177 R X |
| 1,757,732 | 5/1930 | Pade | 198/177 R |
| 504,747 | 9/1893 | Proctor | 34/162 |
| 1,699,573 | 1/1929 | Silva | 198/13 |
| 3,344,938 | 10/1967 | Brooks | 198/177 R X |
| 1,474,492 | 11/1923 | Pierson | 198/13 X |
| 1,723,591 | 8/1929 | Watkins et al | 198/13 |
| 3,565,237 | 2/1971 | Strydom | 198/57 X |

*Primary Examiner*—Evon C. Blunk
*Assistant Examiner*—Douglas D. Watts
*Attorney*—Mason, Mason & Albright

[57] ABSTRACT

A crop drier in a defined space having an endless conveyor with a series of hooks which is disposed near the rear of the space in an inclined portion and along the top of the space in a horizontal portion. The relative disposition of the hooks is controlled so that near the transition from the inclined portion to the horizontal portion they are maintained in the same operative position relative to the defined space and they are caused to disengage crop at two or more selectable locations in the horizontal transit. The floor of the space is movable and heated air moves upwardly through the floor from a space under the floor. In operation, the crop in the space is circulated by the conveyor and moving floor and the thickness of the crop is maintained between 50 and 120 cms with the crop thickness divided by the product of the length of the crop and heated air pressure being maintained at a constant value.

46 Claims, 11 Drawing Figures

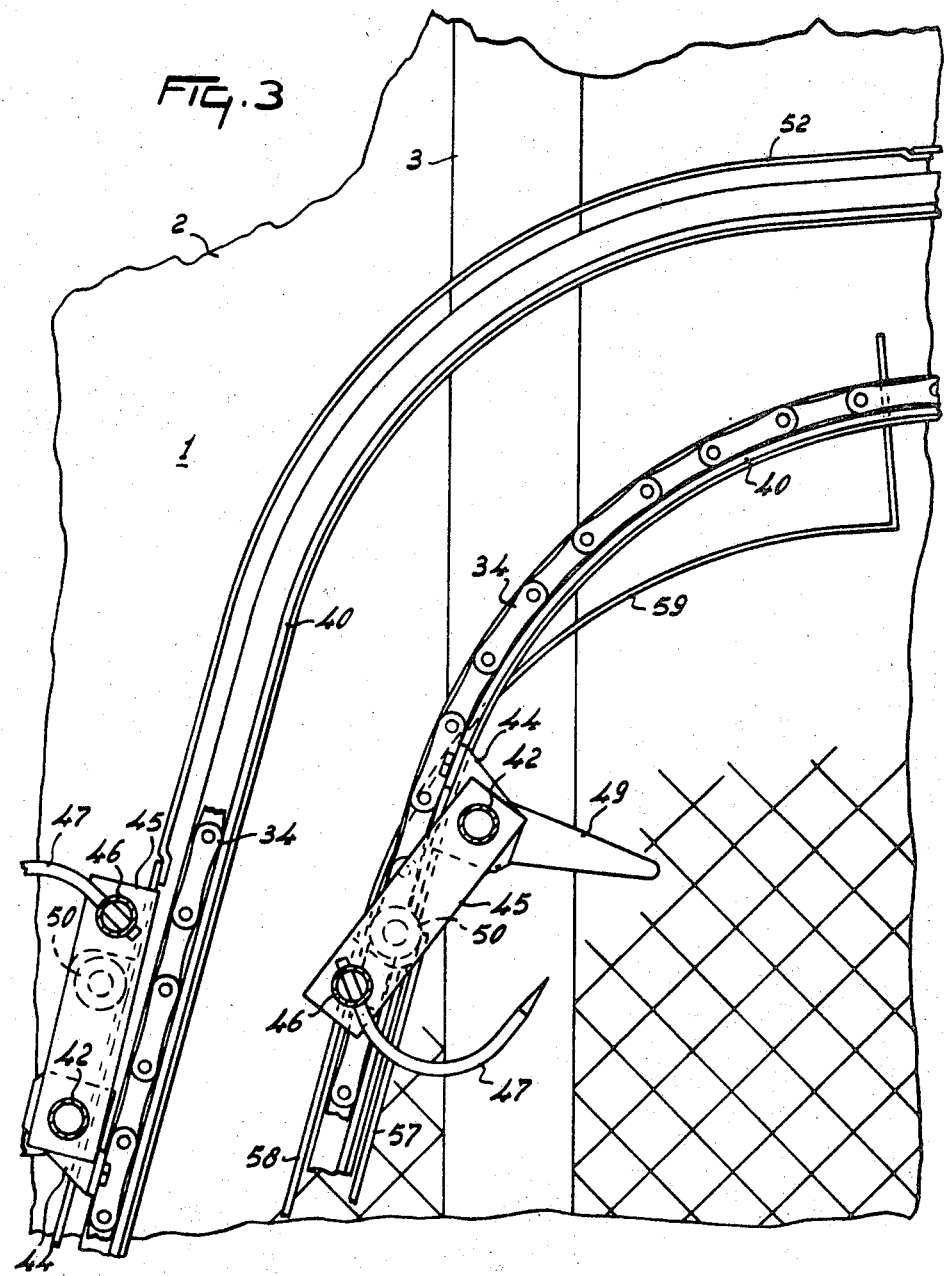

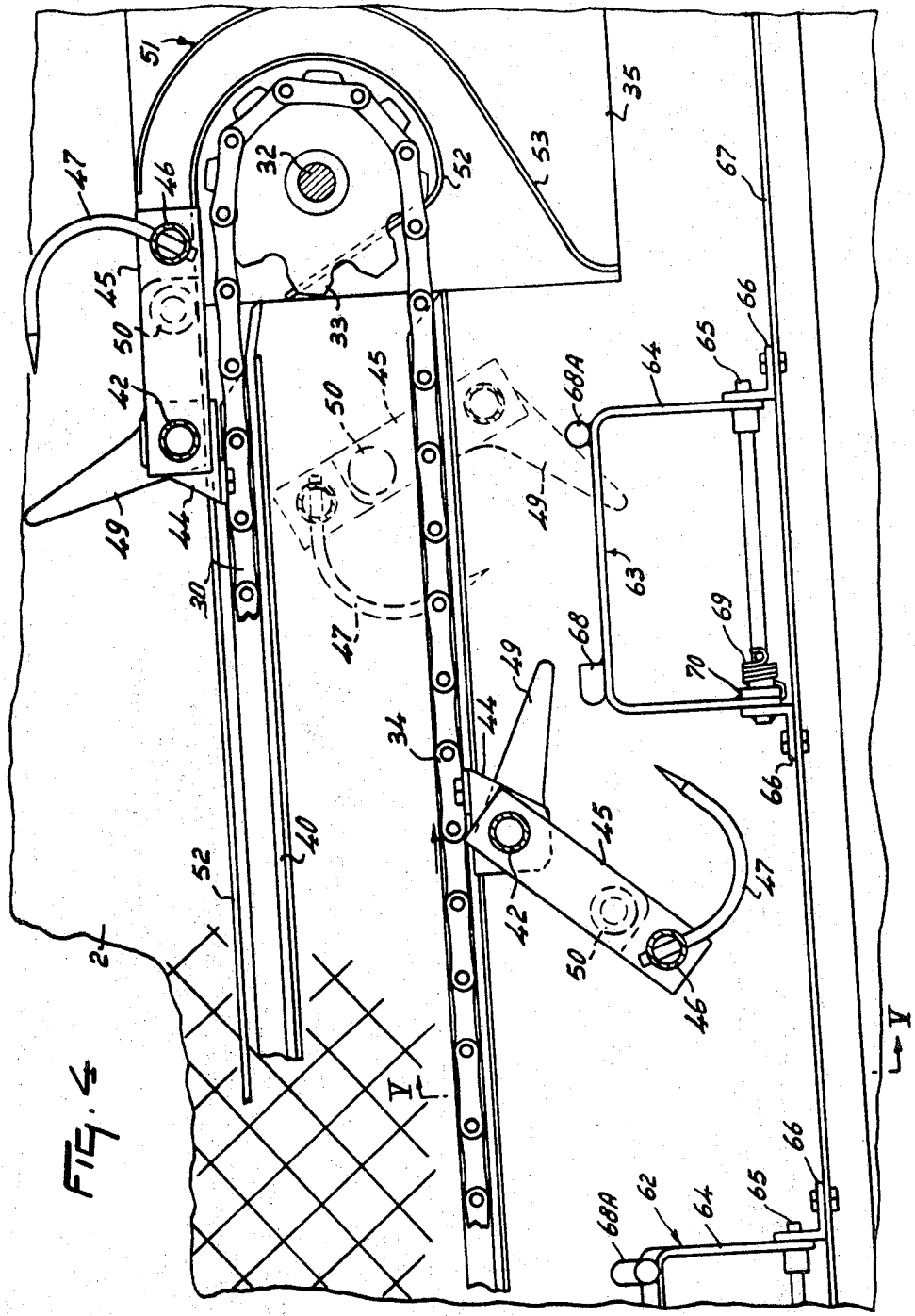

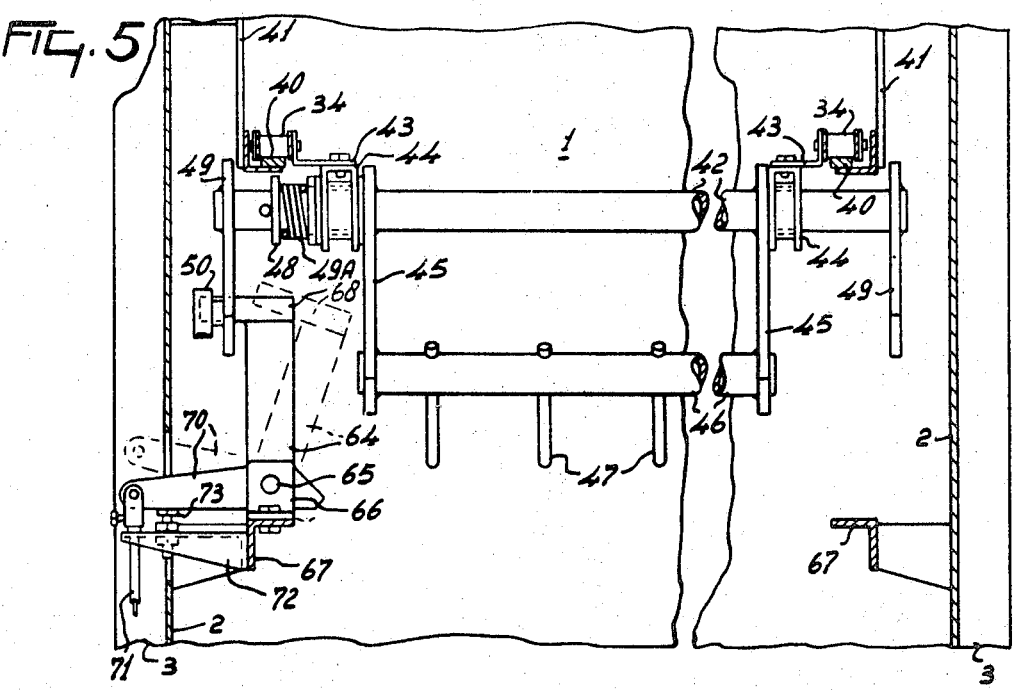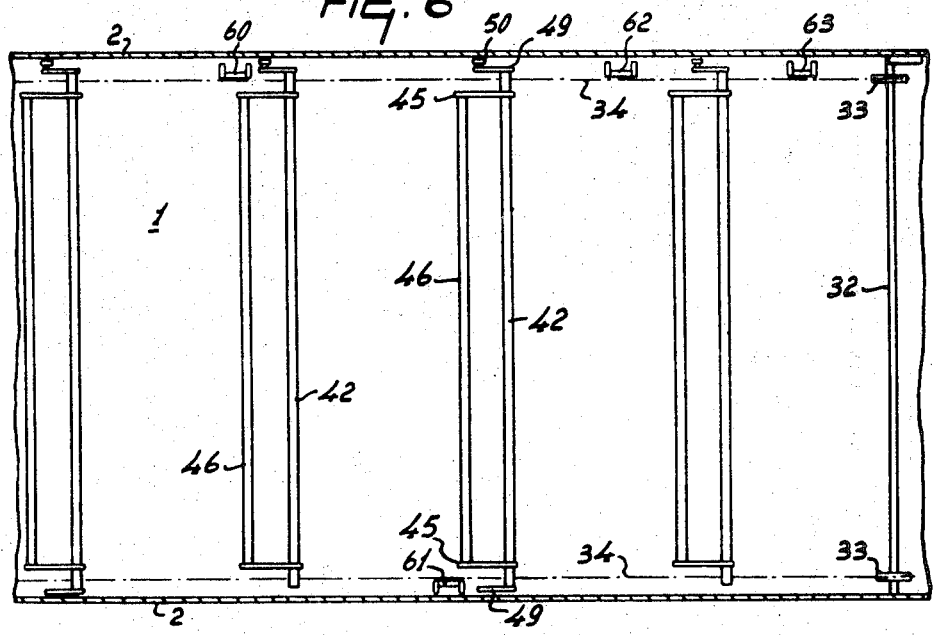

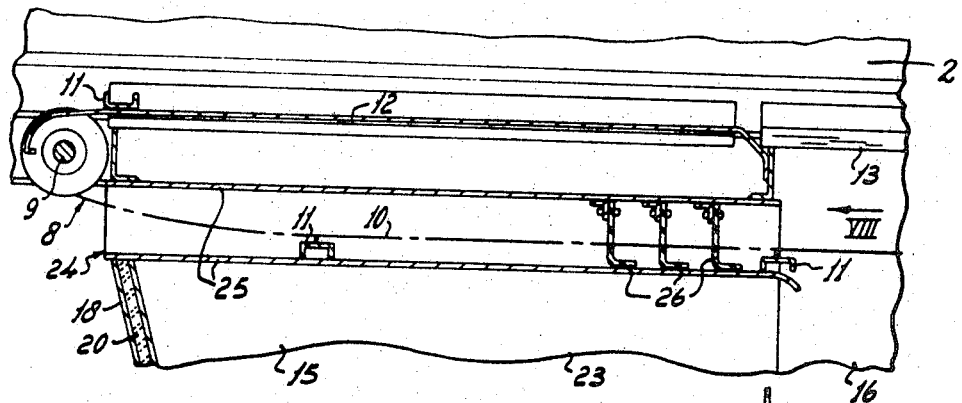
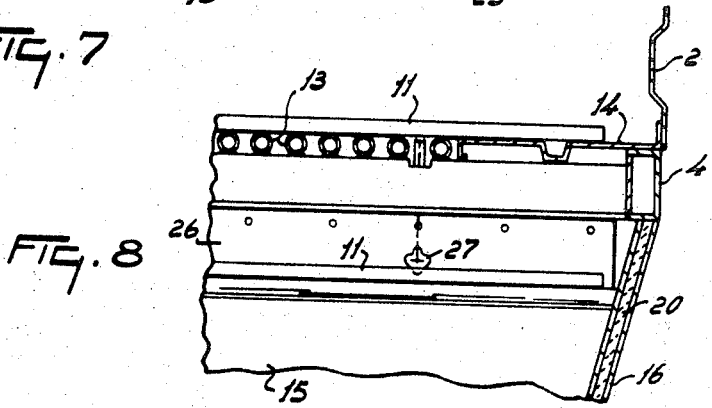
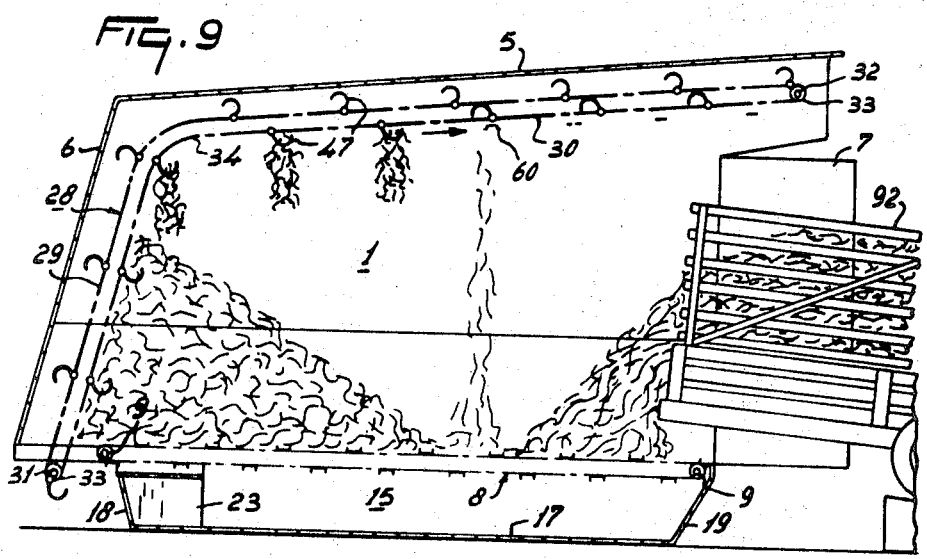

CROP DRIERS AND METHOD OF DRYING CROP

SUMMARY OF THE INVENTION

This invention relates to crop driers and methods of drying crop.

According to one aspect of the present invention there is provided a crop drier comprising a space in which crop can be dried and in which crop conveying means are arranged, the conveying means comprising at least one conveying element which is provided with catches that follow each other in operation for catching small quantities of crop, there being provided means for disengaging the crop from the catches at least at two points.

According to another aspect of the present invention there is provided a method of drying crop in a drier having a drying space, wherein a batch of crop is taken from a quantity of crop in the space and re-supplied to the crop in the space at a different zone, the crop in the space being displaced across the space during the drying process.

For a better understanding of the invention and to show how the same may be carried into effect, reference will now be made, by way of example, to the accompanying drawings, in which:

BRIEF DESCRIPTION OF THE DRAWINGS

FIG. 3 is a sectional side view of the same scale as FIG. 2 of an intermediate portion of the endless conveyor of FIG. 2, FIG. 4 is a sectional side view on the same scale as FIG. 2 of the other end of the endless conveyor of FIG. 2, FIG. 5 is a sectional view taken on the line V—V in FIG. 4, FIG. 6 is a sectional plan view of part of the conveyor of FIGS. 2 to 5, FIG. 7 is a sectional side view showing a portion of a conveyor provided in the floor of the receiving space, FIG. 8 is a fragmentary sectional view taken in the direction of arrow VIII in FIG. 7, FIG. 9 illustrates schematically how the receiving space is filled with crop to be dried in operation of the drier.

DESCRIPTION OF THE PREFERRED EMBODIMENT

Figure 1:
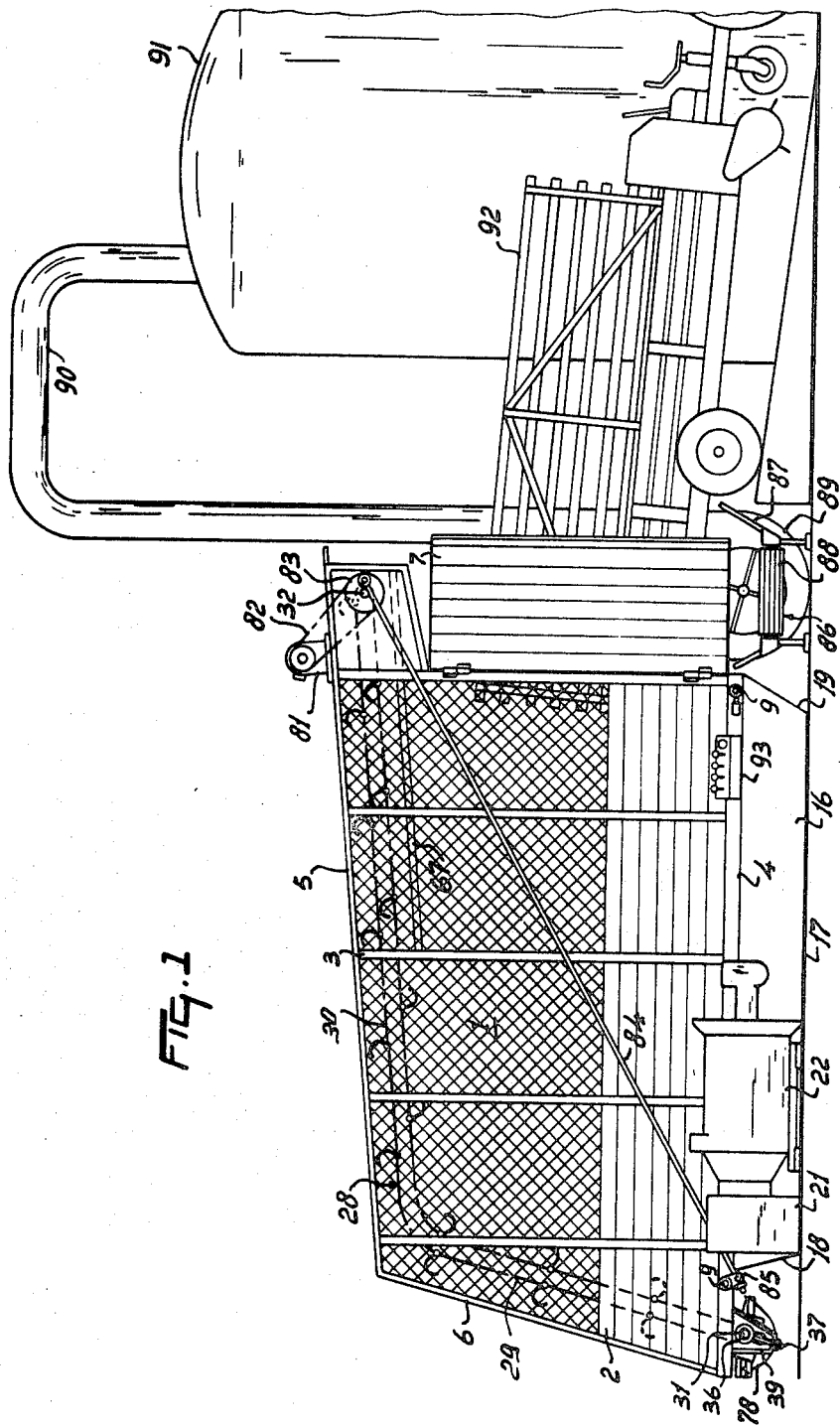
FIG. 1 is a schematic side view of a crop drier shown communicating with a store via a delivery device.

The drier shown in the Figures can receive, dry, and deliver in doses, a quantity of crop supplied, for example, by a pick-up wagon from the field. The elongated crop receiving space 1 of the drier has a floor from the longitudinal side edges of which extend vertical longitudinal walls 2. Each of the longitudinal walls 2 includes a number of vertical beams 3 extending from longitudinal beams 4 between which the floor is disposed. To the beams 3 are fastened closed wall portions extending to a certain height above the floor. Above these closed wall portions each of the longitudinal walls has an apertured wall portion which is formed by mesh work in the form illustrated in the Figures. This mesh work is secured to the beams 3 and to the closed wall portions. The longitudinal walls 2 are interconnected at the top by means of a wall 5.

Hereinafter the front end of the drier will be taken as the end at which crop to be dried can be inserted into the space 1. The rear end (in accordance with this definition) of the space 1 is bounded by a wall 6 which joins the upright walls 2 and the upper wall 5 as will be apparent from FIG. 1, and which is slightly inclined to the front from its lower edge. At the front end of the space 1 two doors 7 are provided, each of which is able to pivot about a substantially vertical axis. After the insertion of a charge of crop the space 1 can be closed at least partly by these doors. ABove the doors 7 an opening is left in the front wall for a purpose to be described hereinafter.

Figure 2:
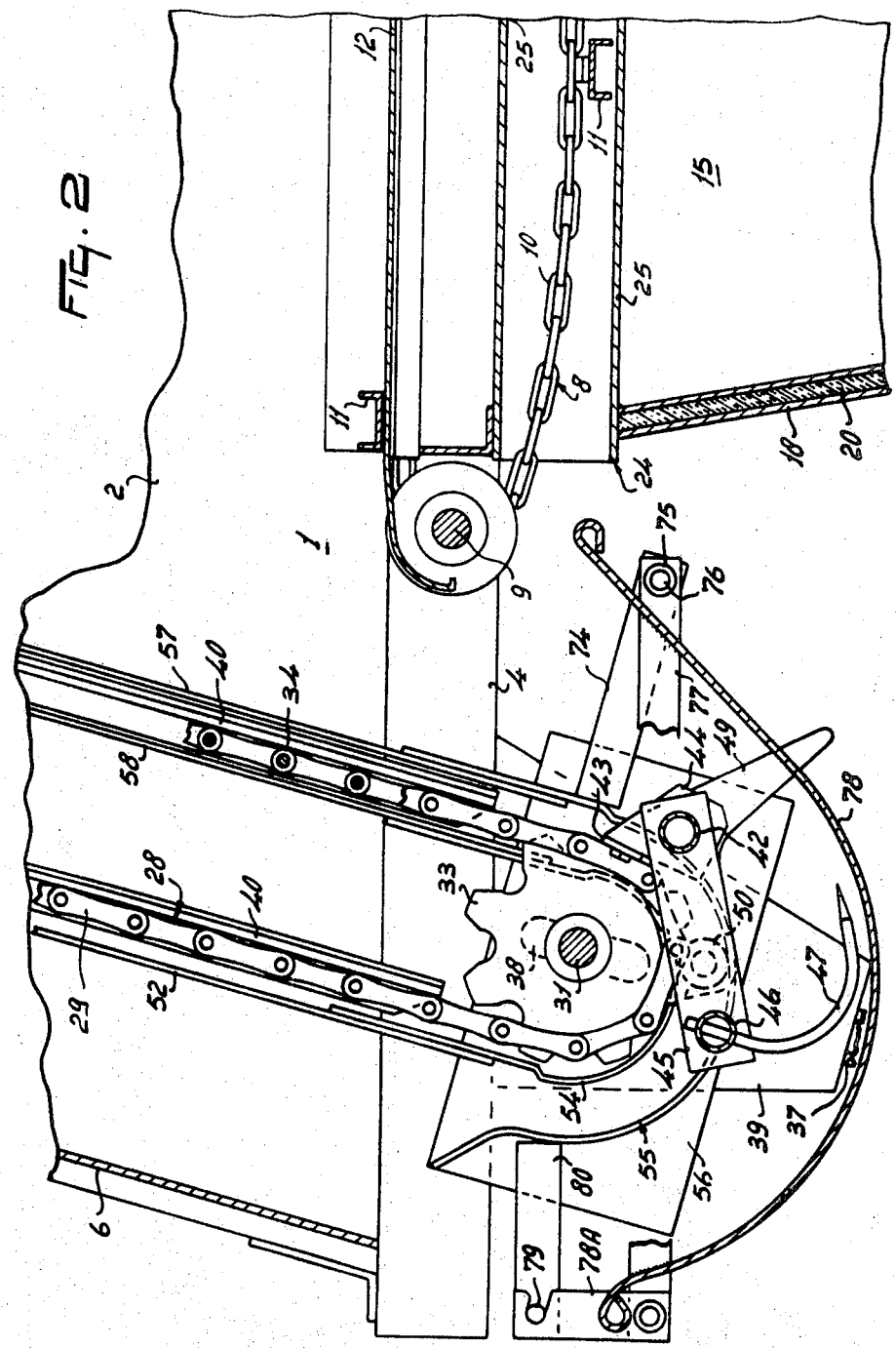
FIG. 2 is a sectional side view on an enlarged scale showing a lower end of an endless conveyor provided in a crop receiving space of the drier of FIG. 1.

The floor of the space 1, as stated above, is disposed between beams 4. It includes an endless conveyor 8 (see FIGS. 2, 7 and 8) consisting of two shafts 9 located near the front and the rear respectively of the space 1 between the beams 4, and two spaced chains 10 between which U-shaped catches 11 extend transversely of the conveyor. These catches co-operate with the upper surface of the floor between beams (FIG. 2). The portion of the floor 4 with which THE CONVEYOR CO-operates, to form, in effect, a moving floor for the space 1, is formed at the front and rear part by longitudinally extending plates 12, these plates 12 extending around the upper portions of the shafts 9. Between the plates 12 are arranged pipes 13, which are spaced apart from each other and extend longitudinally, covering plates 14 (FIG. 8) being provided between the longitudinal beams 4 and the pipes 13. The diameter of each of the pipes 13 is about 20 mms and the distance between the axes of immediately adjacent pipes is about 40 mms. The two outermost pipes 13 on either side of the floor extend beyond the plates 12 at the front and at the rear and form guides for the chains 10.

Figure 10:
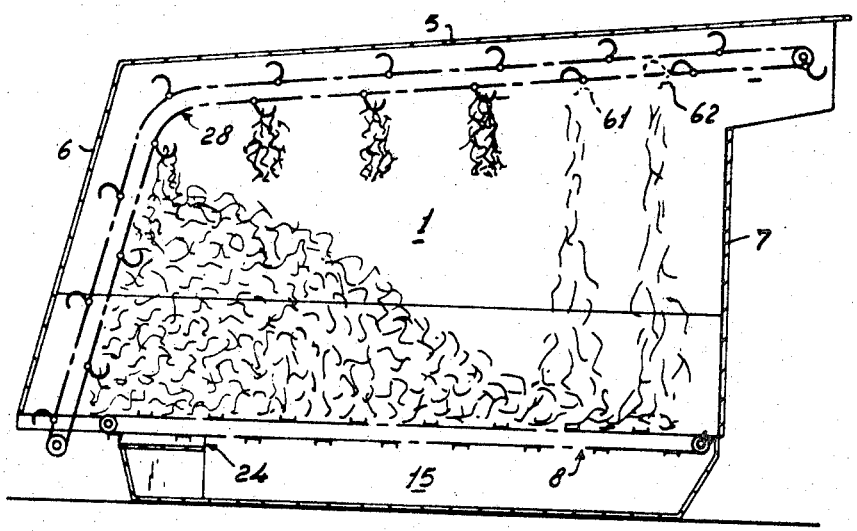
FIG. 10 illustrates schematically the movement of the crop that takes place in the receiving space during the drying process.
Figure 11:
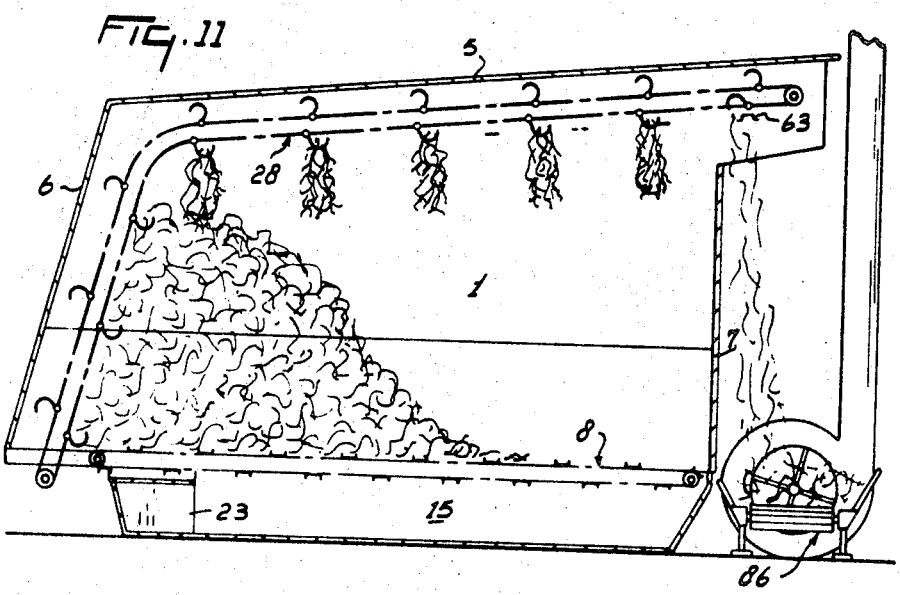
FIG. 11 illustrates schematically how the crop dried in the receiving space can be supplied in doses to the delivery device.

Beneath the floor between beams 4 and space 15 is bounded by vertical walls 16 fastened to the longitudinal beams 4 and interconnected along their bottom edges by a substantially horizontal wall 17, and at their front and rear ends respectively by walls 19 and 18. The walls 16 and 19 are provided with heat-insulating material 20. By means of a blower 21 air heated by a heater 22 can be blown into the space 15 at one end, the blower being disposed to one side of the space 15. On the side of the space 15 opposite the blower 21 a curved plate 23 (FIGS. 9 to 11) is disposed inside the space 15 for guiding the air further into the space 15.

The lower run of the endless conveyor 8 is located in the space 15 beneath the floor between beams 4. Near the rear this run is taken through an air sluice 24 (FIGS. 7 and 8) which is formed by a space located between two substantially horizontal plates 25 and in which flaps 26 of elastic material are disposed one behind the other viewed in the direction of movement of the lower run of the conveyor 8. Each of the flaps 26 has recesses 27 that receive the chains 10 of the conveyor 8.

The endless conveyor 28 provided in the crop receiving space 1 extends from the rear end of the conveyor 8 through a portion 29 parallel to the rear wall 6, i.e.

inclined to the front in upward direction. The portion 29 merges near the top wall 5 of the space with a substantially horizontal portion 30, the other end of which projects out of the opening in the front wall above the doors 7. At the lower, rear, end of the conveyor 28 there is a substantially horizontal shaft 31, located behind the rearmost rotary shaft 9 of the conveyor 8. At the front end there is a shaft 32 extending substantially parallel to the shaft 31. Each of the shafts 31 and 32 is provided near the upright walls 2 with chain sprockets 33, around which roller chains 34 of the conveyor 28 pass, the sprockets 33 on the shaft 31 being freely rotatable with respect to the shaft 31 whereas the sprockets 33 on the shaft 32 are rigidly secured to the shaft 32. The ends of the shaft 32 are journalled in bearings on plates 35 (FIG. 4) secured to the walls 2. The ends of the shaft 31 are journalled in bearings 36, connected with a chain tensioner 37 (FIGS. 1 and 2). When the tensioner 37 is actuated to tension the chains, the ends of the shaft 31 move in slots 38 in plates 39 which support the chain tensioners 37.

The runs of the chains 34 are guided by supports 40 mounted on the vertical walls 2, the form of these supports being shown in FIGS. 2, 3 and 4. The supports 40 are formed by angle-section irons and are secured by strips 41 to the vertical beams 3 of the vertical walls 2 and to the lower closed wall portions (FIG. 5).

Transverse connecting members 42 extend between the chains 34, these members 42 being at a distance from each other of 80 to 140 cms, preferably 110 cms, and being journalled in bearings 44 (FIG. 5) carried by angle supports 43 in turn carried by the chains 34. Near each bearing 44 the associated member 42 is provided with an arm 45. Between the arm 45 of each member 42 a support 46 is fastened so as to extend parallel to this member 42. The supports 46 are each provided at regular intervals with hook-like spring steel tines 47. The tines 47 are curved so that, their sharp ends are orientated in their direction of movement as they move along with the conveyor. On one side of each member 42, between the associated bearing 44 and a stop 48 on the member 42, a compression spring 49A is arranged so that this spring 49A forms a brake counteracting pivotal movement of the member 42 relative to its bearing 44. On at least one end of each member 42 an arm 49 is provided. As will be apparent from FIGS. 2, 3 and 4 each arm 49 consists of a first portion extending parallel to the associated arm 45 and a second portion approximately at right angles to the first portion and inwardly tapering to its free end. Each arm 49 is provided near the end of its first portion with a guide roller 50 which is adapted to co-operate with a guide 51 arranged at the front of the endless conveyor 28 on each of the plates 35 (FIG. 4). Each guide 51 is substantially concentric with the shaft 32 of the conveyor and consists of two spaced strips 52 and 53. The inner strip 52 (relative to the shaft 32) is bent over at its lower end portion to extend past the shaft 32 in order to catch the guide rollers 50, whereas the lower end portion of the outer strip 53 is bent away from the shaft 32. Thus a mouth to the guide 51 is defined.

The strips 52, after extending around the shaft 32, are prolonged parallel to the supports 40 for the chains 34 above the upper and then rearward run of the conveyor up to near the shaft 31 at the lower end of the conveyor. Each strip 52 slidably joins at this place an inner strip 54 of one or other of a pair of guides 55 concentric with the shaft 31 and carried by plates 56 located near the ends of the shaft 31, to which the plates 56 are secured. The guides 55 slidably join guides 57 which extend to near the transition of the portion 29 into the portion 30 of the conveyor 28. The guides 57 have each an inner strip 58 which is prolonged at the upper end by a relative portion 59 (FIG. 3) as a result of which the position of the tine supports 46 at the transition to the substantially horizontal conveyor portion 30 is maintained.

In order to disengage during operation the crop from the tines 47 on the substantially horizontal portion of their path the vertical walls 2 are provided with actuating mechanisms 60, 61, 62 and 63, with which the hook-like arms 49 on the members 42 are adapted to co-operate for pivoting the members 42 and hence their associated supports 46 of the hook-like tines 47. In the form shown four actuating mechanisms 60, 61, 62 and 63 (FIG. 6) are disposed at equal distances one behind the other, viewed in the direction of movement of the crop carried by the conveyor. The three actuating mechanisms 60, 62 and 63 are located on the left-hand side, viewed in the direction of movement of the crop, whereas the fourth actuating mechanism 61 is located on the right-hand side, this mechanism 61 being the second foremost with respect to the direction of movement of the crop. Each of the actuating mechanisms 60 to 63 consist of a bracket 64 (see FIGS. 4 and 5), which pivots about a shaft 65 extending substantially parallel to the inner faces of the longitudinal walls 2. The shaft 65 is mounted between angular supports 66 fastened to longitudinal beams 67 which are secured to the upright beams 3 of the longitudinal walls 2. Between the shaft 65 and one end of the bracket 64 the shaft is surrounded by a spring 69. Each of the brackets 64 is provided with stops 68 and 68A, spaced from each other and adapted to co-operate with the arm 49 at one end of each member 42. For co-operating with the right-hand actuating mechanism 61, alternate transverse members 42 are provided also at their other ends with an arm 49 (FIG. 6).

Each bracket 64 is provided on one side with an arm 70 (FIG. 5), one end of which projects outside the associated longitudinal wall 2, where it is pivotably connected to a Bowden cable 71. Between the arm 70 and a support 72 secured to a beam 3, a set bolt 73 is provided for varying the rest position of the bracket 64.

On their faces facing the conveyor 8 the plates 56 are provided with supports 74 (FIG. 2) which are provided at their ends remote from the plate 56 each with a bearing 75 receiving a stub shaft 76 which is secured to a support 77 to which a trough-shaped receptacle 78 is secured. This receptacle is substantially concentric with the shaft 31. The supports 77 are provided at their ends remote from the shafts 76 each with a pivotable lock bolt 78A which is adapted to co-operate with a pin 79 secured to a support 80 on the plate 56.

For driving the conveyors 8 and 28 an electric motor 81 is provided in the upper part of the drier (FIG. 1). This motor drives the foremost shaft 32 of the conveyor 28 by means of a flexible transmission member such as a belt 82 and a pulley. The shaft 32 is provided with an eccentric 83 which is linked by a rod 84 to a pawl mechanism 85 for driving the bottom conveyor 8 in known manner.

At the front a delivery device 86 is provided, this device including an endless conveyor 88 disposed in a trough 87 and joining at one end the housing of a blower 89 which communicates via a delivery member 90 with a storage container 91.

The drier described operates as follows:

By means of a pick-up wagon 92, the rear end of which can be slipped into the space 1 when the doors 7 are open, the crop can be introduced into the space 1 (see FIG. 1). The crop, unloading from the wagon with the aid of a moving floor thereof, can be displaced to the rear by means of the endless conveyor 8, which conveyor forms a moving floor in conjunction with the floor of the space 1. The rearwardly moving crop thus passes to within the reach of the catches formed by the hook-like tines 47 of the endless conveyor 28, the tines moving in the directions indicated by the arrow in FIG. 9. The hook-like tines 47 carry along a quantity of the rearwardly moving crop during their upward movement along the conveyor portion 29, with each of tines 47 occupying the illustrated position (see, in particular, FIG. 3) under the influence of the guide 57. The position of the tines 47 is maintained through the transition to the conveyor portion 30 by the portions 59 of the strips 58, along which bear against the guide rollers 50 of the arms 49. The supports 46 of the tines 47 on the members 42 are not pivoted by the suspended crop because this is prevented by the braking member located on one side of each member 42 and formed by the compression spring 49A. The position of the tines during the forward movement along the portion 30 of the conveyor 28 is best shown in FIG. 4.

During the placing of the crop in the space 1 the foremost actuating mechanism 60 with respect to the direction of movement of the crop, is operative on the left-hand side. All the other actuating mechanisms 61, 62 and 63 are at this time disposed out of operation, their Bowden cables being freed with the aid of associated actuating arms 93 (FIG. 1), so that the brackets 64 are moved by the springs 69, about the shafts 65, out of the reach of the arms 49 on the members 42. By means of the actuating mechanism 60 the supports of the tines 47 are pivoted so that at the zone indicated in FIG. 9 the crop drops down onto the crop carried by the conveyor 8 in the space 1, so that it is again moved to the rear.

Pivotal movement of one of the members 42 and the associated tine support 46, as effected by the actuating mechanism 63, is illustrated in FIG. 4 in detail. During forward movement, the rearmost portion of the hook-like arm 49, with respect to the direction of movement, comes into contact with the first stop 68 on the bracket 64 of the actuating mechanism 63. The arm 49 together with its associated member 42 and tine support 46 is pivoted so that the foremost portion of the hook-like arm 49 comes into contact with the second stop 68A on the bracket 64 of this actuating mechanism 63. The arm 49, together with the member 42 and tine support 46, is thus provided into the position indicated by the broken lines in FIG. 4. From the starting position the tine support has thus been turned through an angle of about 135°. In this position the crop carried along disengages from the tines and drops down.

When a sufficient quantity of crop has been introduced into the space 1, the doors 7 can be shut. By means of the blower 21 hot air from the heater 22 can be blown into the heating space 15 and the air introduced into this space will flow via the openings between the hollow pipes 13 of the floor of the space 1 into the layer of crop located in the space 1.

The layer of crop in the space 1 may have a thickness D between 50 and 120 cms, being preferably 100 cms. The thickness D of the layer in centimeters divided by the product of the length $l$ of the layer in cms and the air pressure $p$ in cms water gage is constant. This constant value lies between 0.01 and 0.5; preferably it is 0.05. The thickness D of the layer is then 100 cms. The length $l$ of the crop layer is 40 cms and the pressure $p$ of the air is 50 cms water gage.

For drying the crop, which is carried to the rear by the conveyor 8 while the hook-like tine 47 catches a small quantity of the rearwardly moving crop and add it again to the bulk of crop at a different area, the foremost and rearmost actuating mechanisms 60 and 63 are put out of operation, whereas the right-hand and the left-hand actuating mechanisms 61 and 62 respectively are made operative. By means of these actuating mechanisms 61 and 62 two consecutive tine supports 46 are alternately pivoted over a distance corresponding with the distance between the actuating mechanisms, so that the crop drops down and is added to the rearwardly moving quantity of crop (see FIG. 10). During the drying process the crop is consequently constantly moving so that the drying air is passed through an airy layer of crop, after which the air can escape through the mesh work portions of the walls 2.

After the crop has been sufficiently dried, the supply of hot air can be stopped and for some time cool air can be passed through the crop.

The closed blower portions of the walls 2 may have viewing holes.

After drying the actuating mechanisms 61 and 62 are put out of operation and the rearmost, left-hand, actuating mechanism 63 is placed in operation. Thus the tine supports are pivoted at a point such that the disengaged crop drops into the trough 86 of the delivery device, from where the endless conveyor 88 carries it via the blower 89 into the store 91 (see FIG. 11). The crop is thus carried from the device by means of the conveyor 28 in regulated quantities to the delivery device.

The actuating mechanisms 60 and 63 may be put out of operation, as stated above, by means of Bowden cables. When the tension of any one of these Bowden cables is reduced, the bracket 64 of the associated actuating mechanism turns under the action of its spring into a position as is indicated by broken lines in FIG. 5, so that the arms at the ends of the member 43 no longer come into contact with the stops 68 and 68A on the bracket. When one of the Bowden cables is pulled tight by means of its associated actuating arm 93, the associated bracket 64 is turned again into a position in which the arm 49 of the members 42 can come into contact with the stops on the bracket.

The air sluice 24 provided near the rear of the heating space 15 for the lower portion of the endless conveyor 8 ensures that at this end the hot air cannot escape from the heating space 15.

The trough 78, which is adapted to pivot about the shaft 76, receives the conducts away stones and such-like objects carried along with the crop.

A uniform introduction of the hot air into the space 1 is effectively ensured by the pipes 13, which form the major portion of the floor of the space 1. The pipes 13 serve, in addition, as heat exchangers.

The crop drier and doser described above is capable of eliminating the uncertainty of the weather and of saving work, while the operations can be spread owing to the automatic processing of the crop. Moreover, the crop season can be prolonged and loss of nutritional substances can thus be avoided. Moreover, after drying the crop can be supplied in measured quantities to a storage container, or dry crop can be supplied in doses to the store, in which case the drier operates only as a doser.

Drying and dosing of the crop can be carried out fully automatically by the drier described above. By means of humidity-responsive measuring apparatus and timing clock and the like full automation can be further improved. When the air heater 22 is switched on, which operates on the heat-exchanger principle, hot air at 50° to 60° C is blown by the blower into the heating space 15, through which the air passes across the crop to be dried. Moist, fairly cool air can escape through the mesh work in the upper portions of the drier.

During the drying process the upper conveyor 28 remains operative and ensures that the crop is carried in batches to the foremost point of the moving bottom conveyor 8. The resultant continuous movement of a airily stacked crop ensures a uniform and rapid drying, while a homogeneous product can be obtained. After the drying process the drier can be emptied fully automatically by means of the conveyor 28, which has eighteen tine supports, the left-hand, rearmost actuating mechanism 63, with respect to the direction of movement of the crop, being operative so that the crop is discharged near the front above the delivery device.

The moving speed of the conveyors 28 and 8 may be varied in known manner.

The capacity per season amounts to about 150 tons of dry product.

The drier can operate day and night without regard to rainy weather while if desired it is possible to carry on the drying process up to the month of November. The fuel consumption of the air heater is particularly low.

Having thus described our invention, what we claim as new and desired to secure by letters patent of the United States is:

1. A crop drier which comprises: means defining a space for drying crop, said means including a movable floor adapted to convey crop thereon from one end of said space to the other; and endless movable conveyor mounted in said space, said conveyor including an upwardly extending portion at one end of said floor, and a horizontally extending portion over said floor in the upper part of said space, the path of movement for said conveyor being through said portions; a plurality of crop catch means mounted on said conveyor, one in front of the other, which are adapted to engage crop at one end of said movable floor; and means for selectively disengaging crop from said crop catch means disposed at two locations relative to said horizontally extending portion of said conveyor whereby crop disengaged from said catch means at said locations falls through said space to said floor or on crop on top of said floor.

2. A crop drier as claimed in claim 1 having said means for selectively disengaging crop at three locations relative to said path of movement of said movable conveyor, the effective distance between said locations relative to said path of movement being substantially equal.

3. A crop drier as claimed in claim 1, wherein said path of movement of said movable conveyor extends from substantially one end of said space to the other, one of said locations for disengaging crop being proximate one end of said path.

4. A crop drier as claimed in claim 1 having said means for selectively disengaging crop at four locations relative to said path of movement, the first of said crop disengaging means operating to distribute crop in said space when the space is being loaded with crop, the second and third of said crop disengaging means adapted to distribute crop in a crop drying process in said space, and the last of said crop disengaging means adapted to unload crop from said space.

5. A crop drier as claimed in claim 1, wherein said path of movement of said movable conveyor extends from substantially one end of said space to the other, said locations for disengaging crop being between said ends and adapted for circulating crop in said space.

6. A crop drier as claimed in claim 1, wherein said upwardly inclined portion and horizontal portion joins said upwardly inclined portion.

7. A crop drier as claimed in claim 6, wherein said upwardly inclined portion is located rearwardly in said space relative to the direction of movement of crop out of said space, and said substantially horizontal portion is located near the top of said space.

8. A crop drier as claimed in claim 1, wherein said crop catch means each include pivotable support means, said support means each provided with a plurality of hook-like tines in a side-by-side relationship.

9. A crop drier as claimed in claim 8 wherein said support means are disposed substantially horizontally and transversely relative to the direction of movement of said conveying element.

10. A crop drier as claimed in claim 8, wherein the pivotable axis for said support means is parallel to the longitudinal axis of said support means.

11. A crop drier as claimed in claim 8 wherein pivotable shafts are provided for each support means about which each said support means is pivotable, braking means being provided for said pivotable shafts adapted to restrain said support means for turning about said pivotable shafts.

12. A crop drier as claimed in claim 11 wherein a said braking means for each support is disposed proximate each end thereof.

13. A crop drier as claimed in claim 1, there being provided means defining a further space below said floor, means for producing hot air and introducing same into said further space, said endless conveyor adapted to cooperate with said floor for displacing crop in said first mentioned space, said floor having openings for receiving a flow of hot air from said further space.

14. A crop drier as claimed in claim 13 wherein said floor comprises a plurality of spaced apart parallel pipe shaped members.

15. A crop drier as claimed in claim 14 wherein said pipe shaped members extend in the direction of movement of said endless conveyor.

16. A crop drier as claimed in claim 13 wherein an air sluice is provided proximate the rear of said floor, said endless conveyor being received through said sluice.

17. A crop drier as claimed in claim 16 wherein said air sluice comprises a plurality of closing members composed of an elastic material, said closing members being arranged in sequence relative to the movement of said endless conveyor.

18. A crop drier as claimed in claim 1, wherein said conveyor is an endless member, the lower end of said upwardly inclined portion being proximate the rear portion of said endless conveyor.

19. A crop drier as claimed in claim 18 wherein a trough is provided around the lower end of said upwardly inclined portion of the conveyor.

20. A crop drier as claimed in claim 19 wherein said lower end of said upwardly inclined portion of the conveyor rotates about a horizontal disposed shaft, said trough being inclined relative to said shaft.

21. A crop drier as claimed in claim 20 wherein a tensioning member is provided at said lower end of said upwardly inclined portion for tensioning said conveyor together with said lower end of said conveyor being displaceable.

22. A crop drier as claimed in claim 1, wherein pivotable doors are included in the front of said means defining a space for drying a crop, said doors selectively providing an inlet into said space.

23. A crop drier as claimed in claim 22 wherein delivery means is provided proximate said inlet into said space.

24. A crop drier as claimed in claim 1, wherein said means for defining a space for drying crop includes side walls, said side walls having openings provided in their upper portions.

25. A crop drier as claimed in claim 24 wherein more than one-half of the height of said side walls consists of mesh work.

26. A crop drier which comprises: means defining a space for drying crop; crop conveying means arranged in said space; at least one movable conveyor included in said crop conveying means; means defining a path of movement of said movable conveyor; a plurality of crop catch means provided on said movable conveyor, said crop catch means being movable in a predetermined sequence in said space for drying crops; means for selectively disengaging crop from said crop catch means disposed at two locations relative to said means for defining the path of movement of said conveyor; said crop catch means each including pivotable support means, said support means each provided with a plurality of hook-like tines in a side-by-side relationship, pivotable shafts provided for each said support means about which each said support means is pivotable; braking means being provided for said pivotable shafts adapted to restrain said support means from turning about said pivotable shafts; a bearing portion and stop means included in each said pivotable shaft, each said braking means comprising a compression spring surrounding said shaft and being in a state of compression between said stop means and said bearing position.

27. A crop drier as claimed in claim 8, wherein said tine supports are spaced apart a distance of eighty to one hundred and sixty centimeters along said path of movement of said movable conveying element.

28. A crop drier as claimed in claim 27 wherein said means for selectively disengaging crop comprises an arm connected to each said pivotable support means and an actuating mechanism is provided for cooperating with said arm.

29. A crop drier as claimed in claim 28 having at least one further said actuating mechanism, said actuating mechanisms being provided on either side of said crop conveying means.

30. A crop drier as claimed in claim 27 wherein said means for selectively disengaging crop comprises at least three further actuating mechanisms, said means defining a path of movement of said movable conveyor including a substantially horizontal portion which leads to proximate a crop discharge opening into said space, said actuating mechanisms arranged in a successive order along the sides of said horizontal portion.

31. A crop drier as claimed in claim 30 wherein, viewed in the direction of movement of crop along said horizontal portion, one said actuating mechanism is arranged on the right hand side of said horizontal portion and three of said actuating mechanisms are arranged on the left hand side of said horizontal portion.

32. A crop drier as claimed in claim 31 wherein the first of said actuating mechanisms with respect to the direction of movement of crop along said horizontal portion is located on the left hand side of said horizontal portion and the next of said actuating mechanisms in said successive order is located on the right hand side of said horizontal portion.

33. A crop drier which comprises: means defining a space for drying crop; crop conveying means arranged in said space; at least one movable conveyor included in said crop conveying means; means defining a path of movement of said movable conveyor; a plurality of crop catch means provided on said movable conveyor, said crop catch means being movable in a predetermined sequence in said space for drying crops; means for selectively disengaging crop from said crop catch means disposed at two locations relative to said means for defining the path of movement of said conveyor; said crop catch means each including pivotable support means, said support means each provided with a plurality of hook-like tines in a side-by-side relationship; said tine supports being spaced apart a distance of 80 to 160 centimeters along said path of movement of said movable conveyor; said means for selectively disengaging crop comprises at least four actuating mechanisms, said means defining the path of movement of said movable conveyor including a substantially horizontal portion which leads to proximate a crop discharge opening into said space, said actuating mechanisms arranged in a successive order along the sides of said horizontal portion; said actuating mechanisms being arranged whereby viewed in the direction of movement of crop along said horizontal portion, one said actuating mechanism is arranged on one side of said horizontal portion and three of said actuating mechanisms are arranged on the other side of said horizontal portion; the first of said actuating mechanisms with respect to the direction of movement of crop along said horizontal portion being located on said other side of said horizontal portion and the next of said actuating mechanisms in said successive order being located on said one side of said horizontal portion; an even number of pivotable support means being provided on said movable conveyor, each successive pair of said support means including near one end on one of said pair and near both ends on the other of said pair an arm adapted to cooperate with an actuating mechanism.

34. A crop drier as claimed in claim 33 wherein each said arm comprises a portion having a free end and an offset portion, said portion having a free end tapering towards said free end.

35. A crop drier which comprises: means defining a space for drying crop; crop conveying means arranged in said space; at least one movable conveyor included in said crop conveying means; means defining a path of movement of said movable conveyor; a plurality of crop catch means provided on said movable conveyor, said crop catch means being movable in a predetermined sequence in said space for drying crops; means for selectively disengaging crop from said crop catch means disposed at two locations relative to said means for defining the path of movement of said conveyor; said crop catch means each including pivotable support means, said support means each provided with a plurality of hook-like tines in a side-by-side relationship; said tine supports being spaced apart a distance of eighty to one hundred and sixty centimeters along said path of movement of said movable conveyor; said means for selectively dis-engaging crop comprising an arm connected to each said pivotable support means and an actuating mechanism provided for cooperating with said arm; and disengagement means being provided for putting said actuating mechanism out of operation.

36. A crop drier which comprises: means defining a space for drying crop; crop conveying means arranged in said space; at least one movable conveyor included in said crop conveying means; means defining a path of movement of said movable conveyor; a plurality of crop catch means provided on said movable conveyor, said crop catch means being movable in a predetermined sequence in said space for drying crops; means for selectively disengaging crop from said crop catch means disposed at two locations relative to said means for defining the path of movement of said conveyor; said crop catch means each including pivotable support means, said support means each provided with a plurality of hook-like tines in a side-by-side relationship; said tine supports being spaced apart a distance of 80 to 160 centimeters along said path of movement of said movable conveyor; said means for selectively disengaging crop comprising an arm connected to each said pivotable support means and an actuating mechanism provided for cooperating with said arm; and said actuating mechanism comprising a bracket proximate said path of movement of said movable conveyor having stop members mounted thereon in a predetermined sequence.

37. A crop drier as claimed in claim 36 including resilient means which bias said arm in an operative position, whereby said bracket is adapted to be moved to an inoperative position away from the paths of said arms by disengagement means.

38. A crop drier as claimed in claim 37 wherein means is provided for adjusting the position of said bracket.

39. A crop drier as claimed in claim 8, wherein guide means are provided for said support means, said guide means being adapted to control the relative disposition of said catch means.

40. A crop drier as claimed in claim 39, wherein an arm is provided on each of said support means, a guide roller being mounted on said arm which is adapted to cooperate with said guide means.

41. A crop drier which comprises: means defining a space for drying crop; crop conveying means arranged in said space; at least one movable conveyor included in said crop conveying means; means defining a path of movement of said movable conveyor; a plurality of crop catch means provided on said movable conveyor, said crop catch means being movable in a predetermined sequence in said space for drying crops; means for selectively disengaging crop from said crop catch means disposed at two locations relative to said means for defining the path of movement of said conveyor; said crop catch means each including pivotable support means, said support means each provided with a plurality of hook-like tines in a side-by-side relationship; guide means being provided for said support means, said guide means being adapted to control the relative disposition of said catch means; an arm being provided on each of said support means, a guide roller being mounted on said arm which is adapted to cooperate with said guide means; said path of movement includes an upwardly inclined portion and a horizontal portion joining said upwardly inclined portion, said guide means extending around the end and along the top relative to said horizontal portion and around the end and upwardly to near the transition to said horizontal portion relative to said inclined portion.

42. A crop drier as claimed in claim 41 wherein conveyor shafts are provided near the ends of said horizontal and of said inclined portions about which said conveyor rotates, said guide means being substantially concentric with said conveyor shafts near each of said ends.

43. A crop drier as claimed in claim 41 wherein said guide means near the transition to said horizontal portion relative to said inclined portion has a configuration whereby it guides said conveyor so that said tines moving upwardly along said upwardly inclined portion are maintained at the same angular position relative to said space during their transition to said horizontal portion.

44. A crop drier as claimed in claim 8 wherein said tines are composed of spring steel.

45. A crop drier as claimed in claim 8 wherein said tines are oriented during operation in movement along at least part of said path substantially in the direction of movement of said tines.

46. A crop drier as claimed in claim 8 wherein the ends of said tines form sharp points.

* * * * *